United States Patent
X et al.

(10) Patent No.: US 11,657,722 B2
(45) Date of Patent: *May 23, 2023

(54) PROVIDING AUTOMATIC DEPENDENT SURVEILLANCE-BROADCAST DATA FOR UNMANNED AERIAL VEHICLES

(71) Applicant: Verizon Patent and Licensing Inc., Basking Ridge, NJ (US)

(72) Inventors: X, Portland, OR (US); Jonathan Evans, Portland, OR (US); Matt Fanelli, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,037

(22) Filed: Jan. 28, 2022

(65) Prior Publication Data
US 2022/0277656 A1 Sep. 1, 2022

Related U.S. Application Data

(63) Continuation of application No. 16/947,181, filed on Jul. 22, 2020, now Pat. No. 11,270,594, which is a (Continued)

(51) Int. Cl.
*G08G 5/00* (2006.01)
*B64C 39/02* (2023.01)
*G08G 5/04* (2006.01)

(52) U.S. Cl.
CPC ........ *G08G 5/0069* (2013.01); *B64C 39/024* (2013.01); *G08G 5/0008* (2013.01); *G08G 5/0013* (2013.01); *G08G 5/0026* (2013.01); *G08G 5/0082* (2013.01); *B64C 39/02* (2013.01); *B64U 2201/00* (2023.01); *G08G 5/045* (2013.01)

(58) Field of Classification Search
CPC .............. B64C 39/024; B64C 39/02; B64C 2201/14; G08G 5/0069; G08G 5/0008; G08G 5/0013; G08G 5/0026; G08G 5/0082; G08G 5/045
See application file for complete search history.

(56) References Cited

U.S. PATENT DOCUMENTS 6,778,133 B1 8/2004 Cole et al.
9,274,521 B1 3/2016 Stefani et al.
(Continued)

FOREIGN PATENT DOCUMENTS

CN 105913692 8/2016

OTHER PUBLICATIONS

"NPL English machine translation of Weijie (CN-105913692-A) see attached."

*Primary Examiner* — James M McPherson
*Assistant Examiner* — Bakari Underwood

(57) ABSTRACT

A device can be configured to receive flight data from an unmanned aerial vehicle (UAV), where the flight data indicates at least one of an identifier that identifies the UAV, a location of the UAV, an altitude of the UAV, a bearing of the UAV, or a speed of the UAV. The device can be further configured to convert at least a portion of the flight data from a first format to a second format; generate automatic dependent surveillance-broadcast (ADS-B) data based on the converted flight data; and perform an action associated with the ADS-B data.

20 Claims, 6 Drawing Sheets

Related U.S. Application Data continuation of application No. 15/652,151, filed on Jul. 17, 2017, now Pat. No. 10,755,586.

(56) References Cited

U.S. PATENT DOCUMENTS

| | | |
|---|---|---|
| 11,270,594 B2 * | 3/2022 | X .................. G08G 5/0082 |
| 2012/0146849 A1 | 6/2012 | Xu et al. |
| 2013/0036238 A1 | 2/2013 | Chowdhary et al. |
| 2016/0035225 A1 | 2/2016 | Berckefeldt |
| 2017/0012697 A1 | 1/2017 | Gong et al. |
| 2017/0242431 A1 | 8/2017 | Dowlatkhah et al. |

* cited by examiner

PROVIDING AUTOMATIC DEPENDENT SURVEILLANCE-BROADCAST DATA FOR UNMANNED AERIAL VEHICLES

RELATED APPLICATIONS

This application is a continuation of U.S. patent application Ser. No. 16/947,181, entitled "PROVIDING AUTOMATIC DEPENDENT SURVEILLANCE—BROADCAST DATA FOR UNMANNED AERIAL VEHICLES", filed Jul. 22, 2020, which is a continuation of U.S. patent application Ser. No. 15/652,151, entitled "PROVIDING AUTOMATIC DEPENDENT SURVEILLANCE—BROADCAST DATA FOR UNMANNED AERIAL VEHICLES", filed Jul. 17, 2017, now U.S. Pat. No. 10,755,586, issued Aug. 25, 2020, each of which is incorporated herein by reference.

BACKGROUND

Automatic dependent surveillance-broadcast (ADS-B) is a surveillance technology in which an aircraft determines its position via satellite navigation and periodically broadcasts its position, enabling the aircraft to be tracked. ADS-B information can be received by air traffic control ground stations as a replacement for secondary surveillance radar (SSR). ADS-B data can also be received by some aircraft to provide situational awareness and allow for collision avoidance.

DETAILED DESCRIPTION OF PREFERRED EMBODIMENTS

Figure 1:
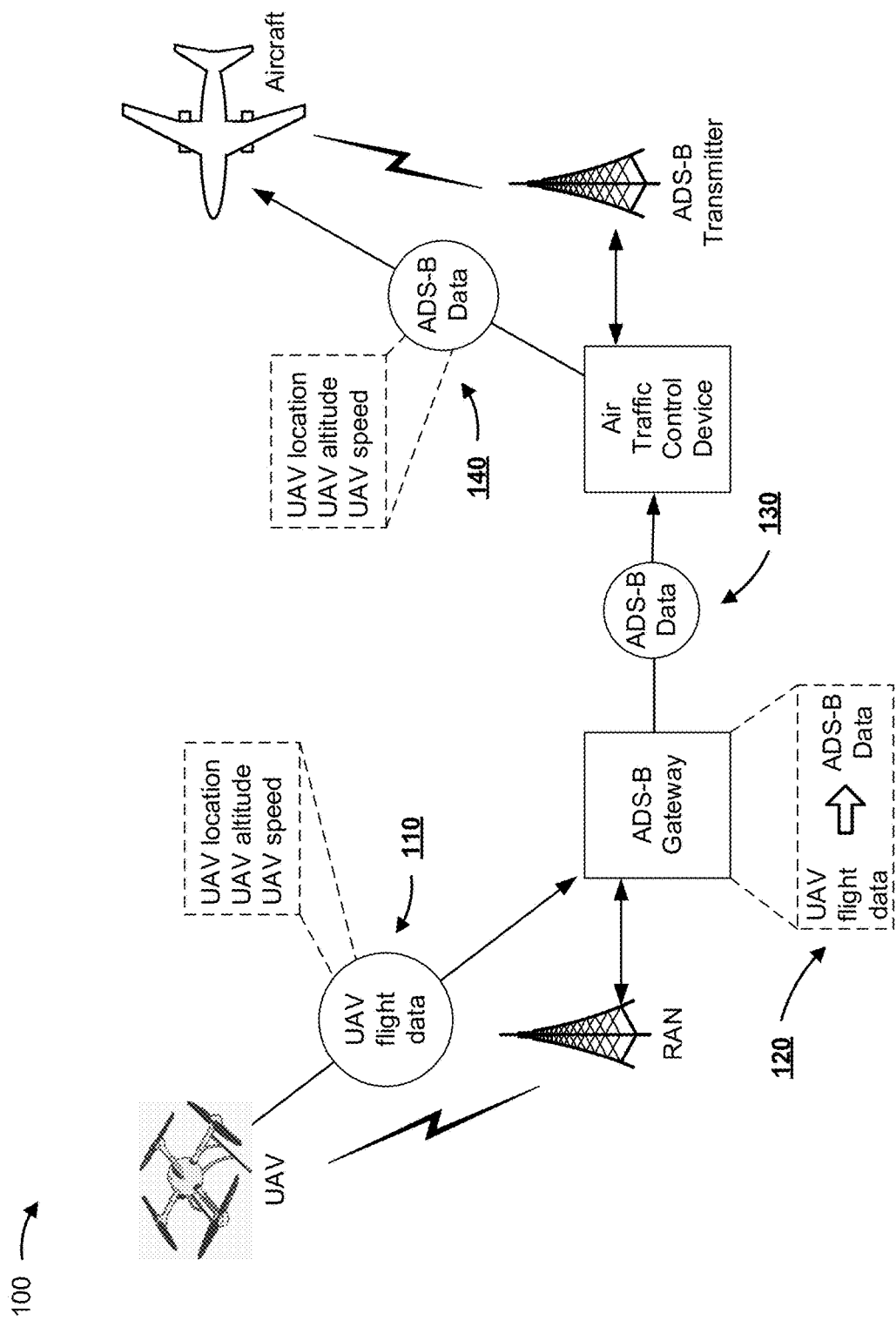
FIG. 1 is a diagram of an overview of an example implementation described herein.

The following detailed description of example implementations refers to the accompanying drawings. The same reference numbers in different drawings can identify the same or similar elements.

While air traffic control stations and some aircraft are able to track nearby aircraft using technologies such as ADS-B and SSR, unmanned aerial vehicles (UAVs) can pose a risk in certain airspaces. UAVs are frequently flown for many different purposes and in many different areas, they are not typically equipped with ADS-B equipment, and they can be difficult to detect using SSR (e.g., due to the relatively small size of many UAVs and the lower altitudes at which UAVs are often flown). The inability for air traffic control stations and aircraft to reliably track UAVs can, in some situations, pose risk to air safety.

Some implementations, described herein, provide an ADS-B gateway to receive flight data from a UAV, generate ADS-B data based on the flight data, and provide the ADS-B data for receipt by air traffic control stations and/or aircraft. For example, the ADS-B gateway can receive, from a UAV or a device in communication with the UAV, UAV flight data (e.g., UAV flight data can be provided to the ADS-B gateway via a radio access network (RAN) such as a long-term evolution (LTE) network). UAV flight data can include a variety of information related to the UAV, such as a UAV identifier, UAV location, UAV altitude, UAV speed, and/or the like. Based on the received UAV flight data, the ADS-B gateway can generate ADS-B data. For example, the ADS-B gateway can identify, from flight data received from the UAV, flight data that is relevant to ADS-B and generate an ADS-B message that includes the relevant flight data formatted for ADS-B technology.

In some implementations, the ADS-B gateway can provide an ADS-B message, which includes UAV flight data formatted for ADS-B, for broadcast to aircraft that can use the UAV flight data included in the ADS-B message to identify and/or track the UAV. In some implementations, the ADS-B gateway can provide ADS-B data to an air traffic control station (e.g., via an internet protocol (IP) based network or the like), enabling the air traffic control station to identify and/or track the UAV and/or broadcast the ADS-B data to aircraft. In some implementations, the ADS-B gateway can provide an ADS-B message to an aircraft using a wireless IP network, such as an LTE network. For example, in some implementations, aircraft can be equipped with an LTE device capable of receiving ADS-B data via LTE and providing the ADS-B data to an ADS-B device of the aircraft.

In some implementations, the ADS-B gateway can facilitate the provision of aircraft ADS-B data to a UAV. For example, ADS-B gateway can receive, from an air traffic control device, an ADS-B message indicating the location, speed, and altitude of an aircraft. In this example, the ADS-B gateway can generate aircraft data for providing a UAV with data that the UAV can use to identify and/or track the aircraft. For example, the ADS-B gateway can generate aircraft data by identifying the relevant flight information included in the ADS-B message, formatting the relevant flight information in a manner capable of being interpreted by the UAV, and send formatted aircraft data to the UAV (e.g., via an LTE network or the like).

Some implementations described herein can enable an air traffic control device to provide aircraft, such as commercial, industrial, and military airplanes and helicopters, with ADS-B messages that facilitate UAV identification and tracking by the aircraft. This can allow aircraft, which might otherwise be unaware of their proximity to one or more UAVs, to have improved situational awareness and enable collision avoidance methods to account for UAVs operating in proximate airspace. Improved situational awareness of the location of UAVs, by air traffic controllers and/or aircraft, can improve the safety of aircraft flights, including UAV flights. In addition, the ability to provide UAVs with aircraft data indicating the location of proximate aircraft, can further improve safety by providing a UAV with situational awareness, which might improve collision avoidance techniques used by the UAV.

By using ADS-B messages, air traffic control stations and/or aircraft can avoid the need to obtain new or upgraded equipment, as an ADS-B gateway can provide UAV flight data in a format readable by existing ADS-B devices. This can reduce the cost of flight safety relative to other options that might require additional or upgraded technology to be equipped by aircraft and/or air traffic controllers. In some implementation, the security of the ADS-B system, can be improved by using IP-based networks to provide UAV flight data to aircraft rather than relying on ADS-B broadcasts, which might be spoofed (e.g., in a situation where an aircraft is equipped with an IP device capable of receiving ADS-B messages over IP and providing the ADS-B messages to an ADS-B device of the aircraft).

FIG. 1 is a diagram of an overview of an example implementation 100 described herein. As shown in FIG. 1, example implementation 100 can include a UAV in communication with an ADS-B gateway via RAN, and an air traffic control device in communication with an aircraft via ADS-B transmitter.

As shown in FIG. 1, and by reference number 110, the UAV can provide flight data to the ADS-B gateway over a RAN, such as an LTE network or the like. For example, various components of the UAV can collect flight data, such as the UAV location from a global positioning satellite (GPS) component, UAV altitude from an altimeter component, and UAV speed from UAV airspeed indicator component. The flight data can be transmitted to the ADS-B gateway using a transmitter component of the UAV, such as an LTE modem or other component capable of transmitting flight data over a RAN.

As further shown in FIG. 1, and by reference number 120, the ADS-B gateway generates ADS-B data based on the flight data received from the UAV. In some implementations, the ADS-B gateway can extract the flight data from an IP-based network packet and format the flight data for inclusion in an ADS-B message. This can include, for example, converting the UAV location, altitude, speed, and/or other flight data into a 56-bit ADS message string. In some implementations, the ADS-B gateway can identify a Mode Select (Mode S) address, or identifier, for the UAV, and include the Mode S address in the ADS-B data. A Mode S address is an aircraft identifier, and the Mode S address for the UAV can be identified by the ADS-B gateway in a variety of ways (e.g., the Mode S address could be provided by the UAV, provided by an entity that owns the UAV, or predetermined based on one or more features of the UAV). In some implementations, the ADS-B gateway can generate an ADS-B message from the flight data. For example, the ADS-B gateway can, using the flight data provided by the UAV, generate a 112-bit ADS-B message that includes the Mode S address associated with the UAV and the ADS data that includes the latitude, longitude, altitude, and velocity of the UAV.

As further shown in FIG. 1, and by reference number 130, the ADS-B gateway provides the ADS-B data to the air traffic control device. In some implementations, the ADS-B data is provided to the air traffic control device via a network, such as an IP-based wired or wireless network. For example, the ADS-B gateway can encapsulate an ADS-B message in an IP packet and transmit the IP packet to the air traffic control device via a network, such as the Internet. In some implementations, the ADS-B gateway and air traffic control device are collocated (e.g., obviating the use of a network to provide ADS-B data to air traffic control device).

As further shown in FIG. 1, and by reference number 140, the ADS-B data that includes the UAV location, altitude, and speed, is provided to an aircraft. In some implementations, the ADS-B data can be provided to the aircraft via an ADS-B transmitter. In this example, an ADS-B device included in the aircraft can receive the ADS-B message and use the data to identify and locate the UAV. In some implementations, ADS-B data can be provided to the aircraft in other ways. For example, ADS-B data can be transmitted to the aircraft using an IP-based network, such as an LTE network, and an IP-based device included in the aircraft can provide the ADS-B data to other systems of the aircraft, such as an ADS-B device. As another example, an air traffic controller can use the air traffic control device to identify and track the UAV from the provided ADS-B data, and the air traffic controller can then use radio communications to inform a pilot of the aircraft regarding the UAVs position.

In some implementations, the ADS-B gateway can provide aircraft data, such as the aircraft location, altitude, and speed, to the UAV or a pilot of the UAV. For example, an ADS-B device included in the aircraft can broadcast an ADS-B message that includes the aircrafts location, altitude, and speed. The broadcast can be received by the air traffic control device, which can provide that ADS-B message to the ADS-B gateway. The ADS-B gateway can then generate an IP-based message for conveying the aircraft data to the UAV and/or to a device being used to pilot the UAV. The IP-based message that includes the aircraft data can then be transmitted to the UAV and/or UAV pilot device via an IP-based network, such as an LTE network, providing situational awareness to the UAV and/or UAV pilot.

Accordingly, the example implementation 100 depicts an ADS-B gateway device that can increase flight safety and efficiency for both manned and unmanned flights. For example, flight safety can be unproved by providing air traffic control, aircraft, UAVs, and/or their corresponding operators, with situational awareness regarding aircraft and/or UAVs that might be in close proximity to one another. The situational awareness can enable aircraft and/or UAVs to avoid potential collisions (e.g., using collision avoidance technology and/or manual control). Flight efficiency can be improved, for example, by providing aircraft and air traffic controllers with a relatively accurate awareness of the aircraft operating in a given airspace, which can enable more precise and/or economical air traffic patterns to be safely used by the aircraft.

As indicated above, FIG. 1 is provided merely as an example. Other examples are possible and can differ from what was described with regard to FIG. 1.

Figure 2:
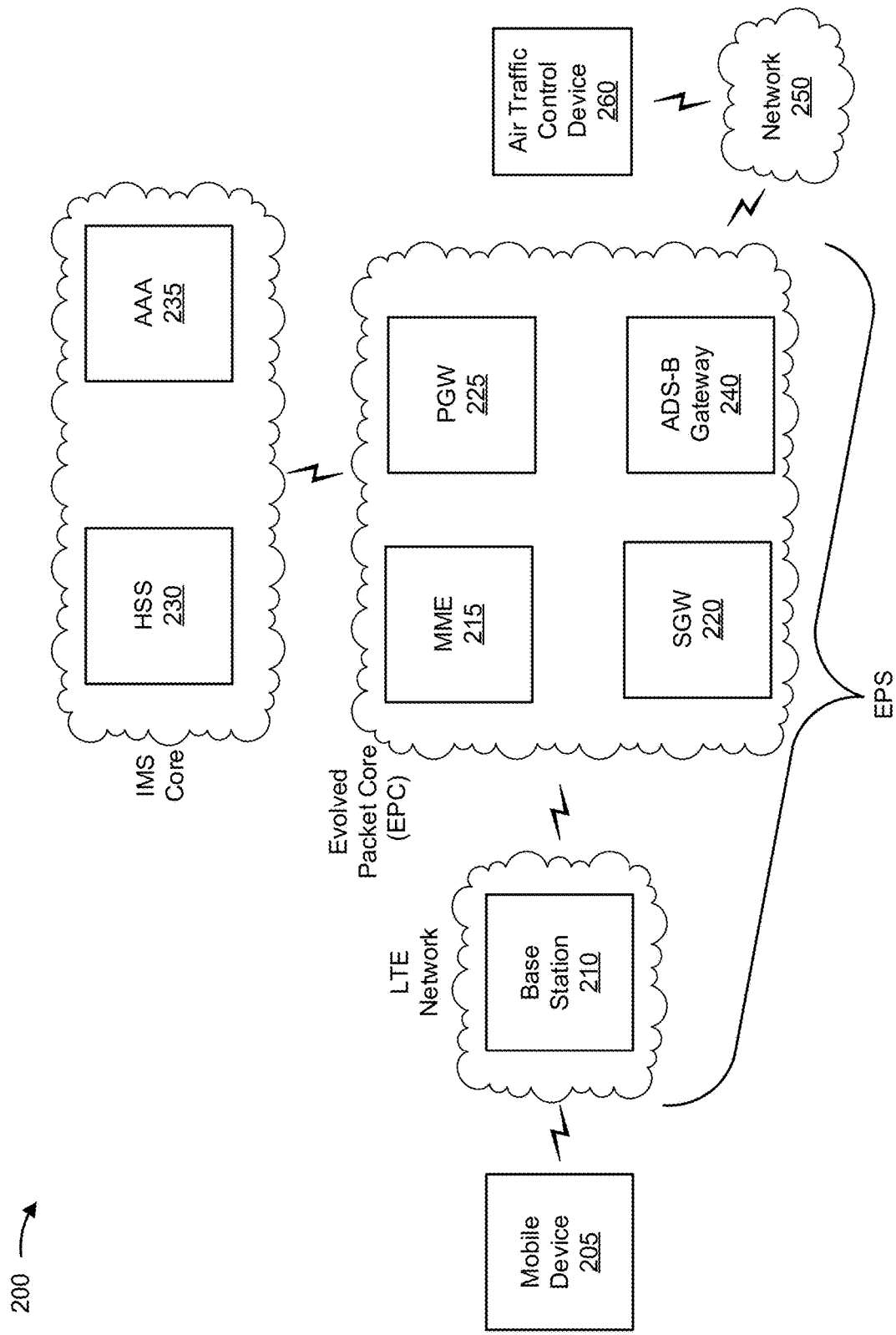
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; an ADS-B Gateway 240; a network 250; and air traffic control device 260. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network, or another type of wireless network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which mobile device 205 communicates with the EPC. The EPC can include MME 215, SGW 220, PGW 225, and/or ADS-B gateway 240 that enable mobile device 205 to communicate with network 250 and/or an Internet protocol (IP) multimedia subsystem (IMS) core. The IMS core can include HSS 230 and/or AAA 235, and can manage device registration and authentication, session initiation, etc., associated with mobile devices 205. HSS 230 and/or AAA 235 can reside in the EPC and/or the IMS core.

Mobile device 205 includes one or more devices capable of communicating with base station 210 and/or a network (e.g., network 250). For example, mobile device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. In some implementations, a mobile device 205 can include a UAV or a device used to pilot the UAV, or mobile device 205 can be included in the UAV, enabling the UAV and/or the device used to pilot the UAV to communicate with base station 210 and/or network 250. Mobile device 205 can send traffic to and/or receive traffic from network 250 (e.g., via base station 210, SGW 220, PGW 225 and/or ADS-B gateway 240).

Base station 210 includes one or more devices capable of transferring traffic, such as audio, video, text, and/or other traffic, destined for and/or received from mobile device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with the LTE network. Base station 210 can send traffic to and/or receive traffic from mobile device 205 via an air interface. In some implementations, base station 210 can include a small cell base station, such as a base station of a microcell, a picocell, and/or a femtocell.

MIME 215 includes one or more devices, such as one or more server devices, capable of managing authentication, activation, deactivation, and/or mobility functions associated with mobile device 205. In some implementations, MME 215 can perform operations relating to authentication of mobile device 205. Additionally, or alternatively, MME 215 can facilitate the selection of a particular SGW 220 and/or a particular PGW 225 to serve traffic to and/or from mobile device 205. MME 215 can perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 can select another MME (not pictured), to which mobile device 205 should be handed off (e.g., when mobile device 205 moves out of range of MME 215).

SGW 220 includes one or more devices capable of routing packets. For example, SGW 220 can include one or more data processing and/or traffic transfer devices, such as a gateway, a router, a modem, a switch, a fuewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. SGW 220 can also receive traffic from network 250 and/or other network devices, and can send the received traffic to mobile device 205 via base station 210. Additionally, or alternatively, SGW 220 can perform operations associated with handing off mobile device 205 to and/or from an LTE network.

PGW 225 includes one or more devices capable of providing connectivity for mobile device 205 to external packet data networks (e.g., other than the depicted EPC and/or LTE network). For example, PGW 225 can include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to mobile device 205 via SGW 220 and base station 210. PGW 225 can record data usage information (e.g., byte usage), and can provide the data usage information to AAA 235.

HSS 230 includes one or more devices, such as one or more server devices, capable of managing (e.g., receiving, generating, storing, processing, and/or providing) information associated with mobile device 205. For example, HSS 230 can manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with mobile device 205. For example, AAA 235 can perform authentication operations for mobile device 205 and/or a user of mobile device 205 (e.g., using one or more credentials), can control access, by mobile device 205, to a service and/or an application (e.g., based on one or more restrictions, such as time-of-day restrictions, location restrictions, single or multiple access restrictions, read/write restrictions, etc.), can track resources consumed by mobile device 205 (e.g., a quantity of voice minutes consumed, a quantity of data consumed, etc.), and/or can perform similar operations.

ADS-B gateway 240 includes one or more devices, such as one or more server devices, capable of receiving flight data from a mobile device 205 and/or air traffic control device 260, generating flight data based on the received flight data, and/or providing mobile device 205 and/or air traffic control device 260 with flight data. For example, ADS-B gateway 240 can receive one or more IP packet(s) from mobile device 205, extract UAV flight data from the IP packet(s), generate an ADS-B message using the extracted UAV flight data, including formatting the flight data for ADS-B, and provide the ADS-B message to air traffic control device 260 (e.g., by encapsulating the ADS-B message in an IP packet and transmitting the packet to air traffic control device 260 via network 250). Flight data received and/or transmitted by ADS-B gateway 240 can, in some implementations, be supported by one or more other devices of environment 200.

Network 250 includes one or more wired and/or wireless networks. For example, network 250 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Air traffic control device 260 includes one or more devices, such as one or more server devices, capable of receiving and/or providing ADS-B data associated with a UAV or other aircraft. In some implementations, air traffic control device 260 can receive, from ADS-B gateway 240, ADS-B data regarding a UAV that includes a mobile device 205. Air traffic control device 260 can provide the ADS-B data regarding the UAV, for example, to a user or an aircraft and/or the like (e.g., air traffic control device 260 can include a display for displaying ADS-B data to a user of air traffic control device, or air traffic control device 260 can use an ADS-B broadcast antenna to broadcast ADS-B data regarding the UAV to an ADS-B device on an aircraft. In some implementations, ADS-B data received and/or provided by air traffic control device 260 can be formatted in a manner suitable for an ADS-B system (e.g., a format suitable for transmission via very high frequency (VHF) (Data link mode 2 or 4), 1090 Extended Squitter (1090ES), 978 megahertz Universal Access Transceiver (UAT), and/or the like). For example, some ADS-B implementations may communicate using pairs of 112-bit messages transmitted using 1090ES technology. In some implementations, air traffic control device 260 can provide, to ADS-B gateway 240, ADS-B data regarding an aircraft. ADS-B data received and/or transmitted by air traffic control device 260 can, in some implementations, be supported by one or more other devices of environment 200.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
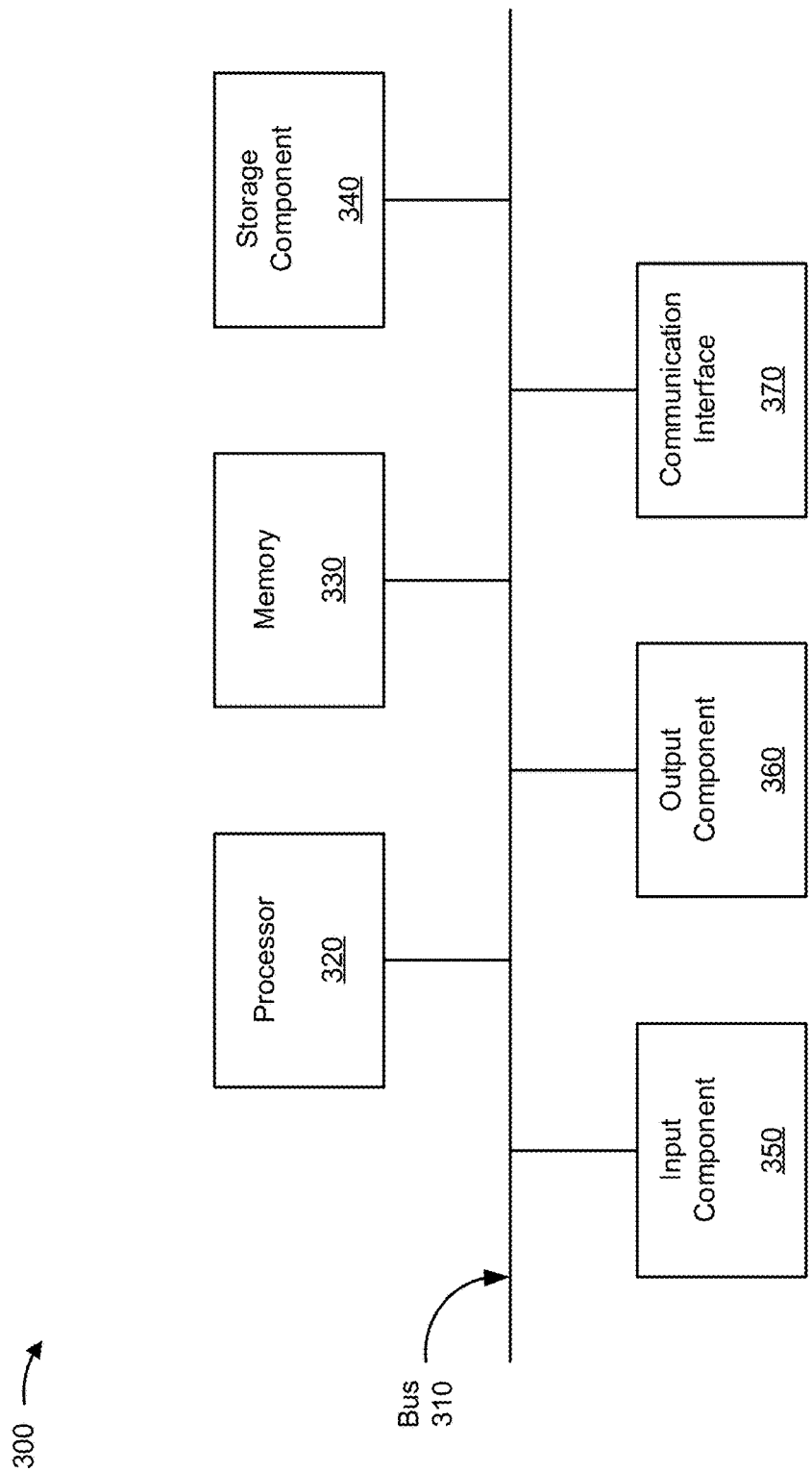
FIG. 3 is a diagram of example components of one or more devices of FIG. 2.

FIG. 3 is a diagram of example components of a device 300. Device 300 can correspond to mobile device 205, base station 210, MIME 215, SGW 220, PGW 225, HSS 230, AAA 235, ADS-B Gateway 240, and/or air traffic control device 260. In some implementations, mobile device 205, base station 210, MME 215, SGW 220, PGW 225, HSS 230, AAA 235, ADS-B Gateway 240, network 250 and/or air traffic control device 260 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
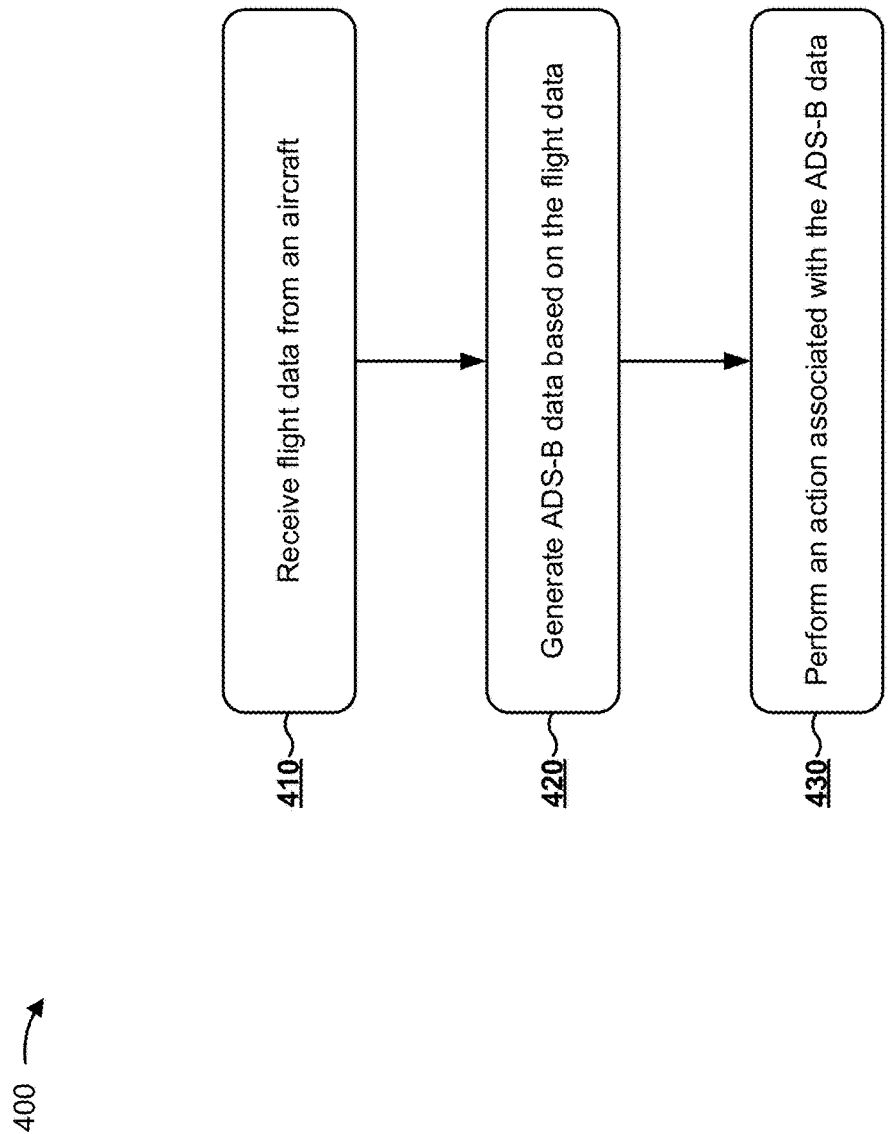
FIG. 4 is a flow chart of an example process for providing automatic dependent surveillance—broadcast data for unmanned aerial vehicles.

FIG. 4 is a flow chart of an example process 400 for providing ADS-B data for UAVs. In some implementations, one or more process blocks of FIG. 4 can be performed by ADS-B Gateway 240. In some implementations, one or more process blocks of FIG. 4 can be performed by another device or a group of devices separate from or including ADS-B Gateway 240, such as mobile device 205, base station 210, MME 215, SGW 220, PGW 225, HSS 230, AAA 235, network 250, and/or air traffic control device 260.

As shown in FIG. 4, process 400 can include receiving flight data from an aircraft (block 410). For example, ADS-B gateway 240 can receive flight data from mobile device 205, which can be included in or in communication with an aircraft, such as a UAV. By way of an example regarding a UAV, a cell phone used to pilot the UAV and/or a communications device included in or otherwise in communication with the UAV, can obtain flight data, such as a UAV identifier, UAV location, UAV altitude, UAV bearing, and/or UAV speed, from a variety of sources, including UAV sensors and/or other device(s) used to track the UAV. The UAV flight data obtained by mobile device 205 can be transmitted to ADS-B gateway 240 via network 250 (e.g., in one or more IP packets transmitted to ADS-B gateway 240 using an LTE network or other type of IP-based network).

The flight data received by ADS-B gateway 240 can be expressed in a variety of ways. For example, a UAV identifier can include a UAV model number, an owner of the UAV, an organization in control of the UAV, and/or the like. UAV location can include a street address, a city, a state, GPS data, and/or the like. UAV altitude can include a barometric altitude measurement, a GPS altitude measurement, and/or the like. UAV bearing can include an absolute bearing, a relative bearing, a waypoint, and/or the like. UAV speed can include a ground speed measurement, an air speed measurement, a GPS speed measurement, and/or the like. Other flight data related to the UAV can also be expressed in a variety of ways.

In this way, ADS-B gateway 240 can receive flight data from a UAV, enabling ADS-B gateway 240 to generate an ADS-B message.

As further shown in FIG. 4, process 400 can include generating ADS-B data based on the flight data (block 420). For example, ADS-B gateway 240 can generate an ADS-B message using the flight data provided by the UAV. In some implementations, ADS-B gateway 240 converts one or more portions of the flight data to a format suitable for the ADS-B system (e.g., a format suitable for transmission via very high frequency (VHF) (Data link mode 2 or 4), 1090 Extended Squitter (1090ES), 978 megahertz Universal Access Transceiver (UAT), and/or the like). For example, the ADS-B gateway 240 can receive flight data regarding the UAV in one or more IP packets, and each portion of the received flight data can be formatted in a way not suitable for transmission via ADS-B. In this situation, ADS-B gateway 240 can format one or more pieces of the flight data in a manner suitable for the ADS-B system and generate one or more ADS-B messages that include the formatted flight data.

By way of example, UAV location data provided by a UAV can include GPS coordinates and/or National Marine Electronics Association (NMEA) 0183 data that specifies the location of the UAV in a particular format, such as degrees, minutes, and seconds, degrees and decimal minutes, and/or decimal degrees. In some implementations, an ADS-B message can specify location using a 17-bit latitude and 17-bit longitude (e.g., expressed in binary, octal, hexadecimal, or decimal format). In this situation, ADS-B gateway 240 can convert the UAV location data provided by the UAV to a 17-bit latitude and 17-bit longitude suitable for inclusion in an ADS-B message.

As another example, UAV altitude data provided by a UAV can include a GPS altitude measurement provided in NMEA 0183 format. In some implementations, an ADS-B message can specify altitude using 12 bits (e.g., expressed in binary, octal, hexadecimal, or decimal format). In this situation, ADS-B gateway 240 can convert the UAV altitude data provided by the UAV to a 12-bit altitude measurement suitable for inclusion in an ADS-B message.

As yet another example, UAV bearing data provided by a UAV can include a waypoint that specifies a geographic location to which the UAV is headed. In some implementations, an ADS-B message can specify bearing using 22 bits of an ADS message (e.g., expressed in binary, octal, hexadecimal, or decimal format). In this situation, ADS-B gateway 240 can calculate a bearing using a current location of the UAV relative to the waypoint location, and convert the result into a 22-bit string specifying a bearing measurement suitable for inclusion in an ADS-B message.

As a further example, UAV speed data provided by a UAV can include a measurement in miles per hour or the like. In some implementations, an ADS-B message can specify a ground speed measurement in knots using 10 bits (e.g., expressed in binary, octal, hexadecimal, or decimal format). In this situation, ADS-B gateway 240 can convert the UAV speed data provided by the UAV to a 10-bit speed measurement suitable for inclusion in an ADS-B message.

In some implementations, ADS-B gateway 240 can determine, based on the flight data, an identifier to include in an ADS-B message. For example, an example ADS-B message can include 24 bits that can be used to identify an aircraft (e.g., using a Mode Select (Mode S) address or the like, such as a Mode S address provided by the International Civil Aviation Organization). In some implementations, each UAV can be associated with a unique identifier suitable for inclusion in an ADS-B message, such as a 24-bit Mode S address. In this situation, ADS-B gateway 240 can identify the Mode S address associated with the UAV from which the flight data was provided, and include the Mode S address in an ADS-B message. For example, the UAV can include the Mode S address in the flight data provided to ADS-B gateway 240, or ADS-B gateway 240 can obtain a Mode S address for the UAV using the flight data. For example, the flight data provided by the UAV can include a UAV identifier, which ADS-B gateway can look up in a database or other data storage device to locate a corresponding Mode S address.

In some implementations, multiple UAVs can be associated with one Mode S address. Given the relatively large number of UAVs that can be actively flying at any given time, providing a unique 24-bit Mode S address to each of them, while retaining uniqueness for other aircraft identified by 24-bit Mode S addresses, might be impractical. Multiple UAVs can be associated with one Mode S address, for example, to enable identification of UAVs in general, or certain types of UAVs. For example, all UAVs can be associated with one Mode S address. As another example, all UAVs belonging to a particular organization can be associated with the same Mode S address, enabling distinction to be made between UAVs of different organisations. As a further example, UAVs can be classified by size and/or weight, and each UAV in a given class of UAV can be associated with the same Mode S address as other UAVs in that given class.

The foregoing example message formatting details for ADS-B messages are merely examples, and many other different types of ADS-B messages, or ADS-B message formatting techniques, can be used to generate an ADS-B message. In some implementations, ADS-B gateway 240 can generate different types of ADS-B messages for the UAV flight data. For example, ADS-B gateway 240 can generate one ADS-B message that specifies a location and altitude of a UAV, and another ADS-B message that specifies a speed and heading of the UAV. In some implementations, ADS-B gateway 240 can generate ADS-B messages in multiple formats. For example, ADS-B gateway 240 can generate, based on UAV flight data, an ADS-B message in a first format for a first air traffic controller and another ADS-B message in a second format for a second air traffic controller.

In this way, ADS-B gateway 240 can generate an ADS-B message based on flight data regarding a UAV. The ability to generate ADS-B data for UAV aircraft can enable ADS-B gateway 240 to perform a variety of actions associated with the ADS-B data, including actions that facilitate aircraft collision avoidance and promote situational awareness.

As further shown in FIG. 4, process 400 can include performing an action associated with the ADS-B data (block 430). For example, ADS-B gateway 240 can perform a variety of actions associated with the ADS-B data. In some implementations, ADS-B gateway 240 provides the ADS-B data to air traffic control device 260. For example, ADS-B gateway 240 can encapsulate one or more ADS-B messages in an IP packet and transmit that packet to air traffic control device 260 via network 250. As another example, ADS-B gateway 240 and air traffic control device 260 can be collocated (e.g., included in the same device and/or in direct communication with one another through a non-network-based interface), obviating the use of network 250 to communicate ADS-B data between ADS-B gateway 240 and air traffic control device 260.

In some implementations, ADS-B gateway 240 can cause the ADS-B data to be broadcast by an ADS-B broadcast device. For example, ADS-B gateway 240 can provide ADS-B data to an ADS-B broadcast antenna, directly or indirectly (e.g., via air traffic control device 260) for transmission to one or more aircraft.

In some implementations, ADS-B gateway 240 can cause the ADS-B data to be provided to a device operating on an aircraft using IP-based network technology. For example, an aircraft can be equipped with a separate device similar to mobile device 205, which can be capable of receiving IP-based network communications, such as LTE communications. In this situation, ADS-B gateway 240 can cause transmission of the ADS-B data to the device included in the aircraft via LTE, enabling the device included in the aircraft to provide the ADS-B data to equipment of the aircraft, such as ADS-B equipment and/or collision avoidance equipment included in the aircraft.

In some implementations, ADS-B gateway 240 can store and/or keep a log of ADS-B data and/or associated UAV flight data. The storage and/or logging of ADS-B data and/or associated UAV flight data can facilitate a variety of functions, such as investigation and analytics functions designed to improve the safety and/or efficiency of UAV and other aircraft flights.

In some implementations, ADS-B gateway 240 can provide a notification based on the ADS-B data. For example, ADS-B data can be provided to an owner/operator of the UAV, enabling the owner/operator of the UAV to use the ADS-B data for a variety of purposes, such as record keeping or analytics. In some implementations, ADS-B data can be provided to an authority, such as a flight safety organization or law enforcement agency. In this situation, ADS-B data can provide situational awareness to authorities that, similar to air traffic controllers that can be operating air traffic control device 260, might be capable of preventing potential problems.

In this way, ADS-B gateway 240 can perform an action associated with the ADS-B data. The action(s) taken (e.g., providing ADS-B messages to air traffic controllers and/or aircraft), can be designed to facilitate safe and efficient operation of an aircraft and/or UAV.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

For example, in some implementations, ADS-B gateway 240 can receive ADS-B data and generate data that can be provided to a UAV and/or mobile device 205 associated with the UAV. In this situation, ADS-B gateway 240 can use techniques similar to those discussed above, to provide aircraft flight data to the UAV and/or UAV pilot. Providing aircraft data to a UAV and/or UAV pilot from ADS-B aircraft data can improve situational awareness of the UAV and UAV pilot (e.g., enabling the UAV and/or UAV pilot to take action designed to avoid a collision with the aircraft associated with the ADS-B aircraft data).

Figure 5:
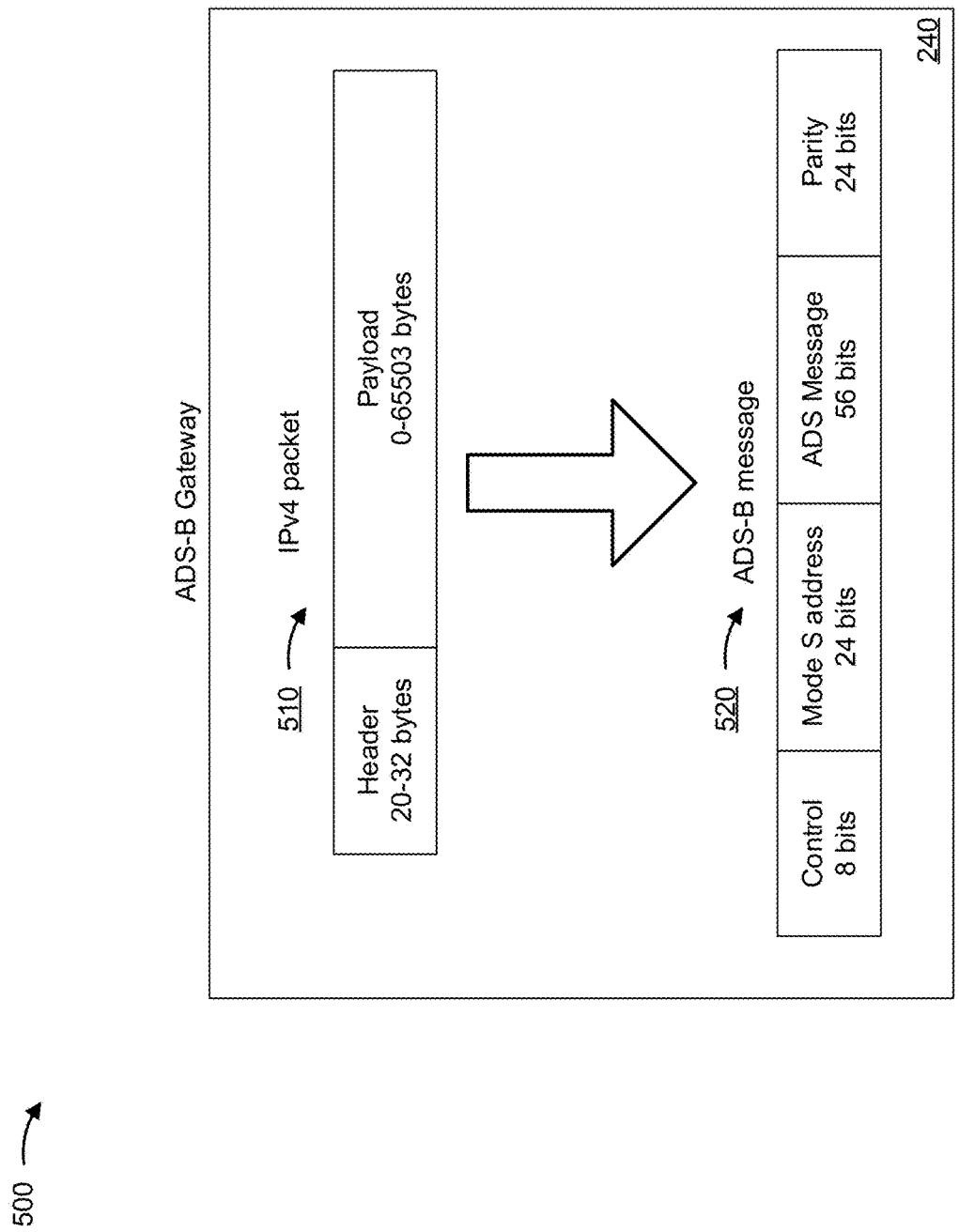
FIG. 5 is a diagram of an example implementation relating to the example process shown in FIG. 4.

FIG. 5 is a diagram of an example implementation 500 relating to example process 400 shown in FIG. 4. FIG. 5 shows an example of providing ADS-B data for UAVs.

As shown in FIG. 5, ADS-B gateway 240 can convert an example Internet protocol version 4 (IPv4) network packet 510 into an example ADS-B message 520. As indicated by the example implementation 500, the example packet 510 can include a header that includes 20-32 bytes of data to enable proper handling of the packet 510 (e.g., identifying packet protocol, packet destination, and/or the like). The example packet 510 also includes up to 65,503 bytes for a payload. In some implementations, an example packet 510 could include all of the UAV flight data to be converted by ADS-B gateway. For example, the payload can include a UAV identifier, UAV location, UAV bearing, and UAV speed.

As also indicated by the example implementation 500, the example ADS-B message 520 can include 8 bits for control, 24 bits for a Mode S address (e.g., a unique aircraft identifier), 56 bits for an ADS message (e.g., such as latitude, longitude, bearing, and/or speed), and 24 bits for parity. In some implementations, ADS-B gateway 240 can identify UAV flight data included in the IPv4 packet 510, convert the flight data to a format suitable for the ADS-B messaging system, and generate an ADS-B message 520, or messages, that include(s) the converted flight data. ADS-B gateway 240 can perform an action based on the ADS-B message 520, such as causing transmission of the ADS-B message 520 by an ADS-B transmitter.

As indicated above, FIG. 5 are provided merely as an example. Other examples are possible and can differ from what was described with regard to FIG. 5.

Figure 6:
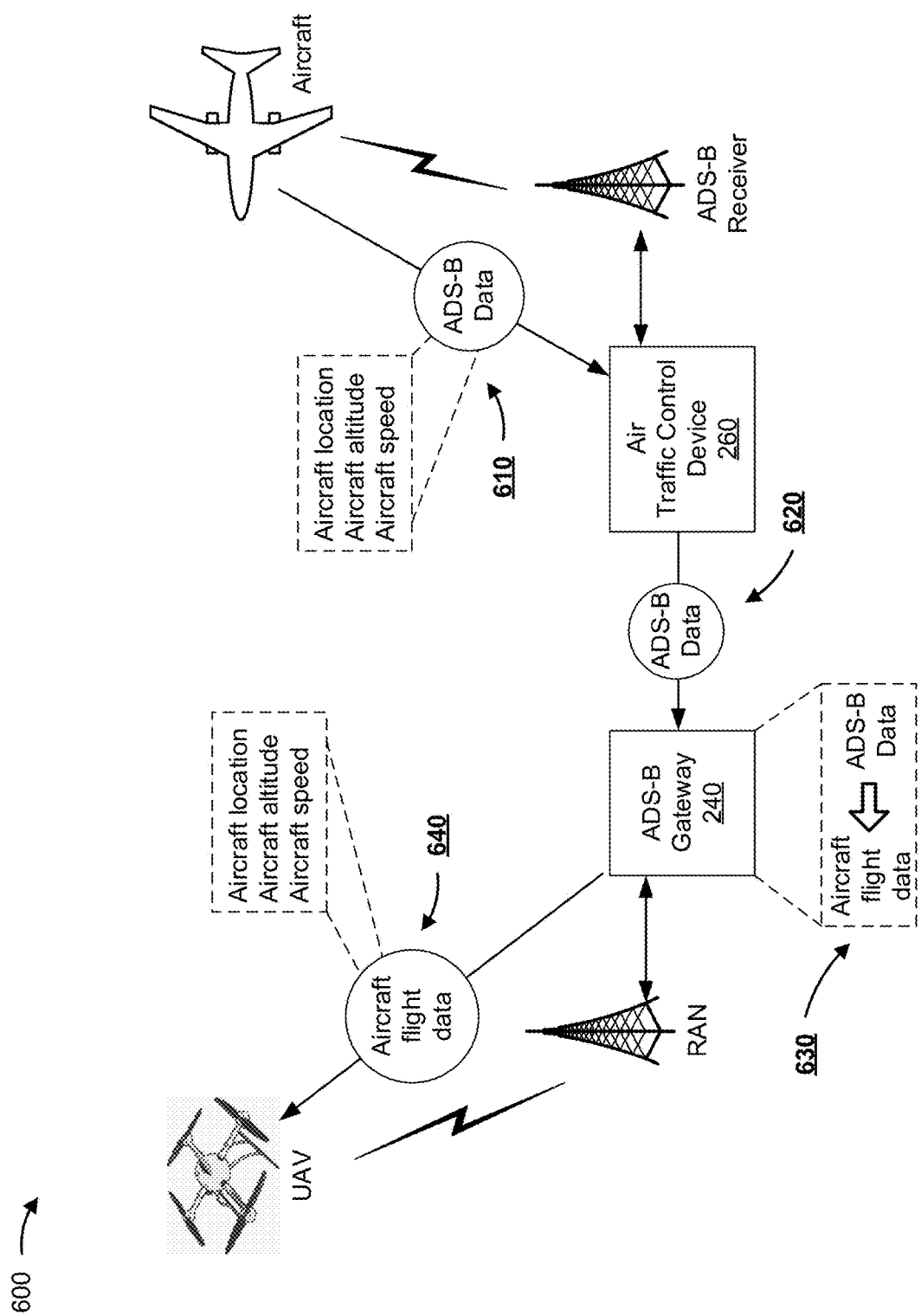
FIG. 6 is a diagram of an example implementation relating to the example process shown in FIG. 4.

FIG. 6 is a diagram of an example implementation 600 relating to example process 400 shown in FIG. 4. FIG. 6 shows an example of ADS-B gateway 240 providing aircraft flight data to a UAV and/or device associated with a UAV.

As shown in FIG. 6, and by reference number 610, an aircraft broadcasts ADS-B data to air traffic control device 260. The ADS-B data can include a variety of flight data for the aircraft, such as an aircraft identifier, aircraft location, aircraft altitude, and aircraft speed.

As further shown in FIG. 6, and by reference number 620, air traffic control device 260 provides the ADS-B data to ADS-B gateway 240. For example, air traffic control device 260 can encapsulate ADS-B data in an IP network packet and transmit it to ADS-B gateway 240 via network 250.

As further shown in FIG. 6, and by reference number 630, ADS-B gateway 240 generates aircraft flight data based on the ADS-B data. For example, in a manner similar to the conversion of UAV flight data to ADS-B data, ADS-B gateway can convert ADS-B data to aircraft flight data that is formatted in a manner suitable for interpretation and/or handling by a UAV and/or a device associated with the UAV.

As further shown in FIG. 6, and by reference number 640, ADS-B gateway 240 performs an action associated with the aircraft flight data. In this example, ADS-B gateway 240 causes transmission of the aircraft flight data to the UAV, e.g., via an IP-based network such as an LTE network.

As indicated above, FIG. 6 are provided merely as an example. Other examples are possible and can differ from what was described with regard to FIG. 6.

Some implementations of ADS-B gateway 240 described herein can improve safety and efficiency of all manner of aircraft flights, including UAVs. For example, ADS-B messages that identify UAVs to aircraft and flight controllers can provide aircraft pilots and air traffic controllers with situational awareness regarding UAVs in airspace that might pose a hazard to the aircraft. Improving situational awareness can, for example, improve navigation and collision avoidance systems. In implementations where aircraft are equipped with devices capable of receiving IP-based transmissions, the security of ADS-B messaging can be improved, e.g., by providing ADS-B data by specific addressing techniques rather than relying on broadcasts that could be spoofed.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, flight data for an unmanned aerial vehicle (UAV), the flight data indicating a location of the UAV and an identifier that identifies the UAV;
    converting, by the device, the location of the UAV from a first location format to an automatic dependent surveillance-broadcast (ADS-B) location format, wherein the first location format comprises a global positioning satellite (GPS) coordinate format;
    determining a Mode select (Mode S) identifier for the UAV based on the identifier that identifies the UAV, the Mode S identifier identifying at least one of an operator of the UAV or a type of the UAV, and wherein the Mode S identifier is associated with a plurality of UAVs;
    generating, by the device, ADS-B data based on the flight data of the UAV, the ADS-B data including the location of the UAV in the ADS-B location format and the Mode S identifier; and
    performing, by the device, an action associated with the ADS-B data.

2. The method of claim 1, wherein the first location format further comprises a National Marine Electronics Association (NMEA) location format.

3. The method of claim 1, wherein determining the Mode S identifier comprises:
    performing a lookup, in a data storage device and using the identifier that identifies the UAV, to identify an association between the identifier that identifies the UAV and the Mode S identifier.

4. The method of claim 1, wherein performing the action comprises:
    transmitting the ADS-B data.

5. The method of claim 1, wherein each of the plurality of UAVs associated with a Mode S address share the at least one of:
- the operator of the UAV, or
- the type of the UAV.

6. The method of claim 1, wherein performing the action comprises:
- causing an ADS-B broadcast antenna to broadcast at least a portion of the ADS-B data.

7. The method of claim 1, wherein performing the action comprises:
- encapsulating at least a portion of the ADS-B data in an internet protocol packet; and
- transmitting the internet protocol packet.

8. A device, comprising:
- one or more memories; and
- one or more processors, communicatively coupled to the one or more memories, configured to:
  - receive flight data from an unmanned aerial vehicle (UAV), the flight data indicating a location of the UAV and an identifier that identifies the UAV;
  - convert the location of the UAV from a first location format to an automatic dependent surveillance-broadcast (ADS-B) location format, wherein the first location format comprises a global positioning satellite (GPS) coordinate format;
  - determine a Mode select (Mode S) identifier for the UAV based on the identifier that identifies the UAV, the Mode S identifier identifying at least one of an operator of the UAV or a type of the UAV, and wherein the Mode S identifier is associated with a plurality of UAVs;
  - generate ADS-B data based on the flight data of the UAV, the ADS-B data including the location of the UAV in the ADS-B location format and the Mode S identifier; and
  - perform an action associated with the ADS-B data.

9. The device of claim 8, wherein the first location format further comprises a National Marine Electronics Association (NMEA) location format.

10. The device of claim 8, wherein the one or more processors, when determining the Mode S identifier, are configured to:
- perform a lookup, in a data storage device and using the identifier that identifies the UAV, to identify an association between the identifier that identifies the UAV and the Mode S identifier.

11. The device of claim 8, wherein the one or more processors, when performing the action, are configured to:
- transmit the ADS-B data.

12. The device of claim 8, wherein each of the plurality of UAVs associated with a Mode S address share the at least one of:
- the operator of the UAV, or
- the type of the UAV.

13. The device of claim 8, wherein the one or more processors, when performing the action, are configured to:
- cause an ADS-B broadcast antenna to broadcast at least a portion of the ADS-B data.

14. The device of claim 8, wherein the one or more processors, when performing the action, are configured to:
- encapsulate at least a portion of the ADS-B data in an internet protocol packet; and
- cause transmission of the internet protocol packet.

15. A non-transitory computer-readable medium storing a set of instructions, the set of instructions comprising:
- one or more instructions that, when executed by one or more processors of a device, cause the device to:
  - receive flight data from an unmanned aerial vehicle (UAV), the flight data indicating a location of the UAV and an identifier that identifies the UAV;
  - convert the location of the UAV from a first location format to an automatic dependent surveillance-broadcast (ADS-B) location format, wherein the first location format comprises a global positioning satellite (GPS) coordinate format;
  - determine a Mode select (Mode S) identifier for the UAV based on the identifier that identifies the UAV, the Mode S identifier identifying at least one of an operator of the UAV or a type of the UAV, and wherein the Mode S identifier is associated with a plurality of UAVs;
  - generate ADS-B data based on the flight data of the UAV, the ADS-B data including the location of the UAV in the ADS-B location format and the Mode S identifier; and
  - perform an action associated with the ADS-B data.

16. The non-transitory computer-readable medium of claim 15, wherein the first location format further comprises a National Marine Electronics Association (NMEA) location format.

17. The non-transitory computer-readable medium of claim 15, wherein the one or more instructions, that cause the device to determine the Mode S identifier, cause the device to:
- perform a lookup, in a data storage device and using the identifier that identifies the UAV, to identify an association between the identifier that identifies the UAV and the Mode S identifier.

18. The non-transitory computer-readable medium of claim 15, wherein the one or more instructions that cause the device to perform an action associated with the ADS-B data, cause the device to:
- encapsulate the ADS-B data in an internet protocol packet.

19. The non-transitory computer-readable medium of claim 15, wherein each of the plurality of UAVs associated with a Model S address share at least one of:
- the operator of the UAV, or
- the type of the UAV.

20. The non-transitory computer-readable medium of claim 15, wherein the one or more instructions that cause the device to perform an action associated with the ADS-B data, cause the device to:
- cause an ADS-B broadcast antenna to broadcast a portion of the ADS-B data.

* * * * *